United States Patent [19]

Laviana

[11] 4,090,531

[45] May 23, 1978

[54] PNEUMATIC CONTROL DEVICE

[75] Inventor: Lawrence J. Laviana, Kensington, Conn.

[73] Assignee: M.H. Rhodes, Inc., Avon, Conn.

[21] Appl. No.: 707,482

[22] Filed: Jul. 22, 1976

[51] Int. Cl.[2] .................... G05D 16/00

[52] U.S. Cl. .................... 137/624.12; 137/82

[58] Field of Search .................... 137/624.11, 624.12, 137/82

[56] References Cited

U.S. PATENT DOCUMENTS

| | | | |
|---|---|---|---|
| 2,713,900 | 7/1955 | Bloom | 137/624.11 |
| 2,827,119 | 3/1958 | Mueller | 137/624.11 |
| 3,788,593 | 1/1974 | Cohen | 137/624.11 X |
| 3,931,832 | 1/1976 | Holder | 138/624.11 |

*Primary Examiner*—Alan Cohan

*Attorney, Agent, or Firm*—Hubbell, Cohen, Stiefel & Gross

[57] ABSTRACT

A pneumatic control device for operating pneumatic apparatus in a pneumatic control system. The control device includes a pneumatic conduit having a bleed orifice therein, one end of the conduit being adapted to accommodate an air pressure source, a venting member for regulating the flow of air through the bleed orifice, the venting member being movable between a first position in which the flow of air through the orifice is unimpeded by the venting member and a second position in which substantially no air will flow through the orifice, a timing means activatable for a variable but predetermined time period which time period is selectable at the outset of activation, and a control means connected to the timing means and to the venting member for controlling the movement of the venting member between the first and second positions upon the activation and deactivation of the timing means.

5 Claims, 8 Drawing Figures

PNEUMATIC CONTROL DEVICE

BACKGROUND OF THE INVENTION

A. Field of the Invention

This invention pertains to devices for controlling the operation of pneumatic apparatus in a pneumatic control system. More particularly, this invention relates to a device of the type wherein the operation of the associated pneumatic apparatus is controlled by regulating the pressure in a pneumatic conduit, the conduit being connected to the pneumatic apparatus and to a pressure source. Most particularly, this invention relates to a device of the type wherein regulation of the pressure in the pneumatic conduit is accomplished by controlling the flow of air through a bleed orifice contained in the conduit.

B. Prior Art

Devices for providing pneumatic control of various apparatus are well known as typified by U.S. Pat. No. 3,233,105 (pneumatic controller) U.S. Pat. No. 3,613,951 (dispensing system), U.S. Pat. No. 3,680,739 (aerosol spray control) and U.S. Pat. Nos. 3,741,476 and 2,284,561 (thermostat controllers). Recently, there has been an increased demand for pneumatic control devices precipitated in large part by the desire on the part of many industries to switch over from electrical to pneumatic control systems. One reason for this change has been the increasingly complex electrical codes with which many electrical installations must comply. By switching to pneumatic control systems many of the increased costs occasioned by such compliance are avoided. Moreover, electrical control systems generally require more frequent and more complex maintenance than their pneumatic counterparts.

Generally, control systems serve to control the operation of various peripheral devices such as air-conditioners, boilers, lights etc. This function may be accomplished with pneumatic control systems by utilizing pneumatically activated switching.

In such systems, it is often desirable to provide some form of manual control for one or more of the peripheral devices, and accordingly, it is one object of this invention to provide a manually activatable timer controlled pneumatic control device wherein the period of activation is selectable at the outset of activation, the device having the capability of controlling the operation of one or more associated pneumatic apparatus, such as, for example, a pneumatically activated switch.

SUMMARY OF THE INVENTION

This invention relates to a manually operable pneumatic control device which may be activated for a selectable period of time, which period of time is selectable at the outset of activation, the device being capable of controlling the operation of associated pneumatic apparatus.

The device includes a timing means, activatable for a predetermined time period, a pneumatic conduit containing a bleed orifice, one end of the conduit being adapted to accommodate a supply pressure source, a venting member for controlling the flow of air through the orifice, and control means connected to the timing means and to the venting member for moving the venting member between a first position in which the flow of air through said orifice will be unrestricted by said venting member, and a second position in which substatially no air will flow through said orifice. In operation, the pneumatic conduit will also be interconnected with the pneumatic apparatus, such as a pneumatically activatable switch, whose operation is to be controlled.

Typically, prior to the activation of the control device the venting member will be in the first position and the pressure within the conduit will be determined by the ambient pressure outside the orifice. Normally, the ambient pressure will equal atmospheric pressure. Thereafter, upon activation of the control device, the control means will move the venting member to the second position in which the pressure within the conduit will be determined by the supply pressure source, the resulting pressure change within the pneumatic conduit in turn resulting in the activation of the pneumatic switch or other pneumatic apparatus.

The switch will remain activated until the expiration of the preselected time period, at which time the control means will move the venting member back to the first position, the pressure within the conduit will be restored to a level equal to the ambient pressure outside the orifice, and the pressure change will result in the deactivation of the pneumatic switch.

In one embodiment of the invention, the timing means, the control means, the venting member, and the portion of the pneumatic conduit containing the bleed orifice are all disposed within a hermetically sealed housing unit, the pressure within the housing unit being regulated by a control pressure source via a second conduit connected to said control pressure source and extending into the housing unit. This embodiment permits greater regulation of the pressure within the pneumatic conduit and hence of the pneumatic apparatus whose operation is to be controlled.

Further features of the device according to the invention will become apparent from the following detailed description and annexed drawings, which disclose certain non-limiting examples of embodiments preferred at present.

DETAILED DESCRIPTION OF THE PREFERRED EMBODIMENTS

Figure 1:
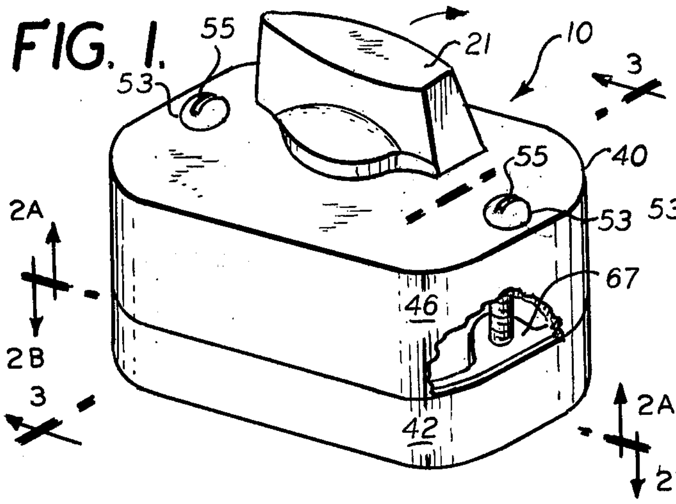
FIG. 1 is a partially exploded perspective view of the preferred pneumatic control device according to the present invention.
Figure 3:
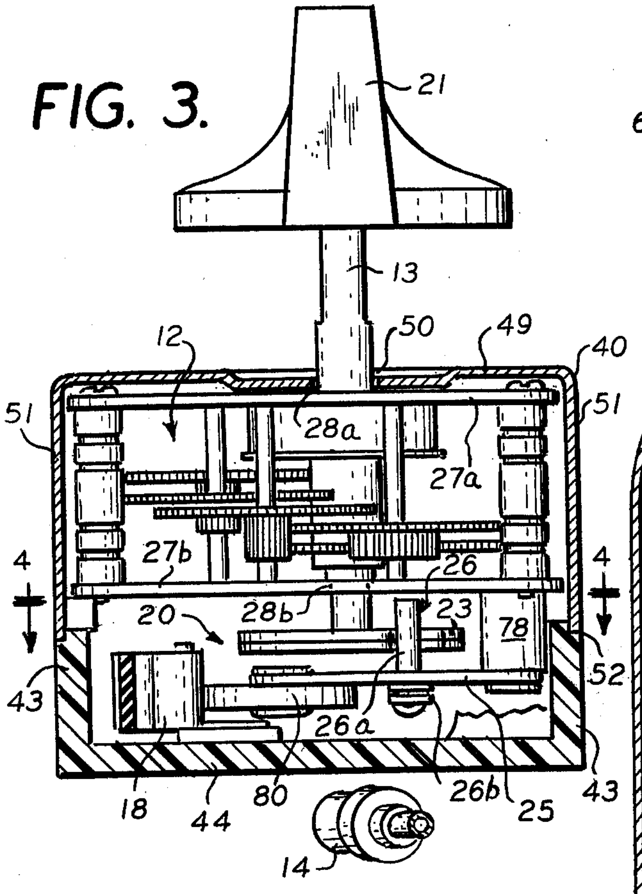
FIG. 3 is a view partly in vertical central section and partly in elevation taken along the line 3—3 in FIG. 1.
Figure 4:
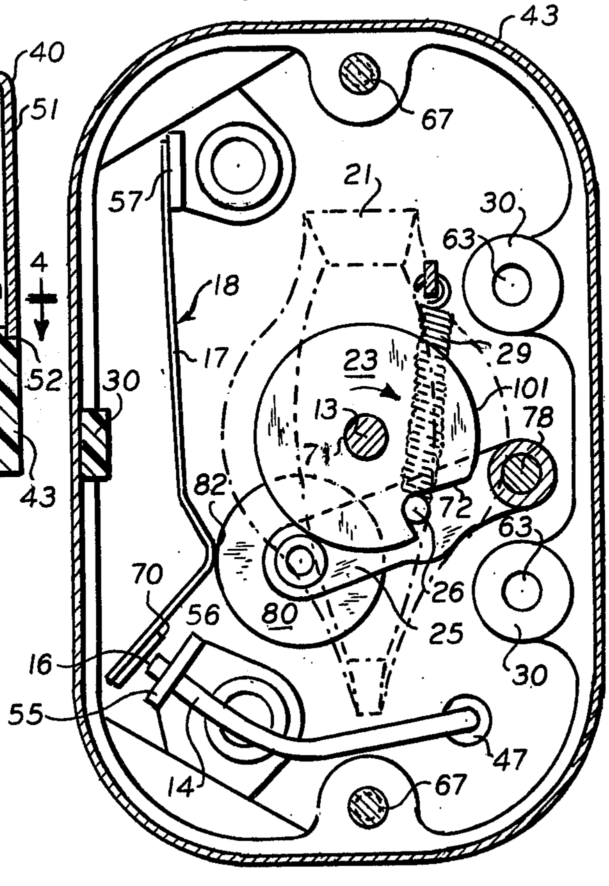
FIG. 4 is a view partly in horizontal section and partly in elevation taken along the line 4—4 in FIG. 3 showing the control means and the venting member in a first position.

Referring now to the drawings in detail and particularly to FIG. 1 thereof, a pneumatic control device embodying the present invention is generally designated by the reference numeral 10. As shown in FIGS. 3 and 4, apparatus 10 includes a timing means 12, activatable for a selectable variable time period, a pneumatic conduit 14 having a bleed orifice 16 at one end, the other end being suitably adapted to be connected to an air pressure source, a venting member 18 for regulating the rate of air flow through the orifice 16, and control means 20 connected to the timing means 12 for controlling the movement of the venting member 18 upon the activation and deactivation of the timing means 12.

Control device 10 is preferably mounted in a housing structure 40, and while the housing structure may be of any desired construction, preferably, and as shown in FIGS. 1, 3 and 4, it is comprised of a plastic base member 42 and a metal cover 46. As shown, base member 42 has a bottom wall 44 and is bordered by an upwardly extending peripheral side wall 43 the transverse portion 44 of which has an opening 47 through which the pneumatic conduit 14 extends. The cover 46 has an upper wall 49 which is bordered by a downwardly extending peripheral side wall 51. Wall 49 has a centrally located hole 50 and a first pair of screw ports 53. The side wall 43 has a peripherally extending groove 52 to accomodate the peripheral side wall 51 of the cover 46, the base member being secured to the cover by a first pair of screws 55 extending through said first pair of ports 53 and threadably connected to a pair of threaded bosses 67 formed in the base member 42.

While mechanically activatable mechanical timing means 12 is shown in FIG. 3 and employed in the preferred embodiment, the use of numerous other timing means and techniques for the activation thereof are deemed obvious to those skilled in the art and any may be used.

With reference to FIG. 3, timing means 12 is mounted between an upper wall partition **27*a* having a centrally located shaft bore 28*a* and lower wall partition 27*b*, having a centrally located shaft bore 28*b*, said shaft bores 28*a* and 28*b* being in alignment with hole 50 in wall 49. Preferably, and as best seen in FIG. 4, timing means 12 is secured in the housing structure 40 by seating the lower partition 27*b* on a plurality of abutments 30, said abutments being preferably integrally formed in the base member 42. As shown, a second pair of screw ports 63 is provided in two of said abutments 30, said second pair of screw ports 63 being aligned with a corresponding pair of screw holes 64 in the lower wall partition 27*b*, whereby the timing means 12 may be secured to the base member 42 by a second pair of screws (not shown). Of course, numerous other means of securing timing means 12 to the structure 40** are well known to the skilled art worker and any may be advantageously employed.

As shown in FIG. 3, extending through the shaft bores **28*a* and 28*b* and bore 50 is a shaft 13, said shaft being suitably connected with the timing means 12 such that said timing means 12 will be activated upon clockwise rotation of said shaft 13**.

Fixedly seated on the portion of the shaft 13 on the outside of housing 40 is a knob 21, whereby to facilitate manual rotation of the shaft 13 to activate the timing means 12 for a variable but predetermined or preselected time period, said time period being dependent upon the extent of rotation of shaft 13. Once the timing means 12 is activated, the shaft 13 is rotated in a counterclockwise direction by the timing means 12, the shaft 13 returning to its initial position upon the expiration of said predetermined or preselected time period. This will be more fully understood as this description progresses.

Preferably, and as best shown in FIG. 4, the pneumatic conduit 14 comprises a piece of metallic tubing, the portion of said conduit extending through the opening 47 into housing structure 40 being open-ended, said opening constituting the bleed orifice 16. As presently preferred, the conduit 14 is secured to the base member 42 by a first hinge 55 mounted on the transverse portion 44 of base member 42, said first hinge having a passage 56 through which the pneumatic conduit 14 extends, the conduit being secured to said first hinge 55, preferably by being welded thereto.

Preferably, the venting member 18 is comprised of a flexible metallic arm 17 having an elbow 82 in the intermediate portion thereof. To secure the arm 17 in proper relation to the orifice 16, preferably a second metallic hinge 57 is mounted on the base member 42 as shown in FIG. 4, one end of the arm 17 being riveted thereto. As will be more fully understood as this description progresses, with timing means 12 deactivated, the free end of the arm 17 will be sufficiently spaced from the orifice 15 whereby the flow of air through said orifice will be unimpeded by said venting member. Fixedly attached to the portion of the arm 17 which is in confronting relationship with orifice 16 is a sealing member 70, said sealing member 70 comprising a piece of impervious compressible material such as, for example, rubber, said member serving to more effectively seal the orifice 16 when said arm 17 is in said second position.

Figure 2A:
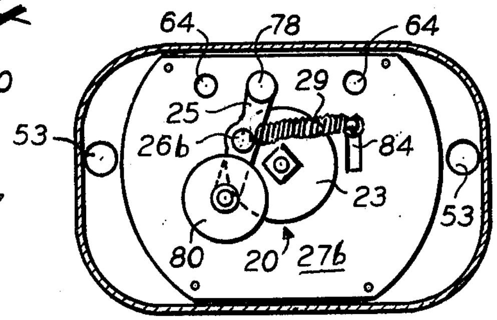
FIGS. 2A and 2B are views partly in horizontal section and partly in elevation taken generally along the lines 2A—2A and 2B—2B in FIG. 1 showing, respectively, the control means and the venting member of the preferred pneumatic control device.
Figure 2B:
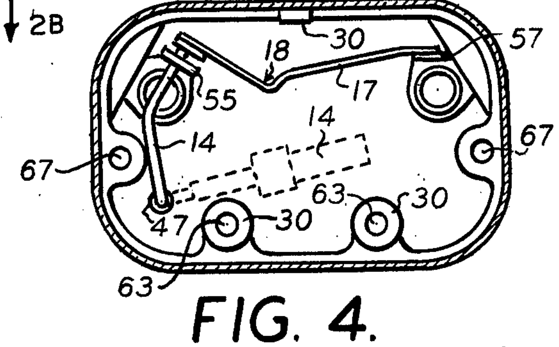

To control the movement of the venting member 18, any suitable control means 20 may be employed. As presently preferred and shown in FIG. 2A, control means 20 includes a disc 23, a connecting rod 25 and a spring element 29, all of which are of preferably metallic construction although other suitable materials may be employed.

As is best shown in FIG. 4, disc 23 has a peripheral angular notch 72, and a centrally located aperture 71, said aperture being of sufficient size to accommodate the portion of the shaft 13 which extends through the partition **27*b*, the element 23** being fixedly seated on said shaft.

Referring now to FIGS. 3 and 4, extending through the intermediate portion of the connecting rod 25 and formed therewith is a projection 26, said projection having an upper portion **26*a* and a lower portion 26*b*. As will be more fully explained hereinafter, connecting rod 25 is positioned with respect to the disc 23 such that with timing means 12 deactivated the upper portion 26*a* of the projection 26 will be seated in the notch 72. As shown, one end of the connecting rod 25 is pivotally mounted on a post 78, the post 78 being fixedly secured to the partition 27*b* and extending upwardly therefrom. Fixedly mounted on the free end of connecting rod 25 is a preferably circular contact member 80, the periphery of said contact member being in engaging relation with the elbow 82 of the venting member 18 when timing means 12 is deactivated, whereby to position said venting member 18 in said first position in which said sealing member 70 is spaced from said orifice 16** to permit venting.

To secure the portion **26*a* of projection 26 in the notch 72 and for additional reasons which will be more fully apparent as this description progresses, one end of the spring 29 is secured to the lower portion 26*b* of the projection 26, the other end being hooked on a supporting post 84 formed in the partition 27b** and extending upwardly therefrom.

Figure 6:
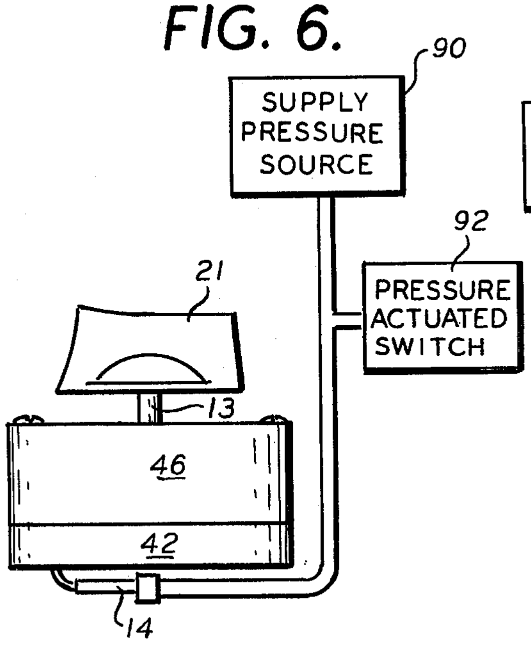
FIG. 6 is a schematic representation showing a pneumatic control system incorporating the preferred pneumatic control device.

The operation of the control device 10 will now be described. In order to explain the mode of operation it will be assumed, as shown in FIG. 6, that the conduit 14 is suitably connected to a supply pressure source 90 and to an associated pneumatic apparatus which operates in response to pressure changes in the conduit 14. Such an apparatus may be, as shown in FIG. 6, a pneumatically activatable switch 92, said switch being assumed closed when said timing means 12 is deactivated. It will also be assumed that the ambient pressure within the structure 40 is atmospheric pressure, this being less than the pressure of the supply source 90.

As shown in FIG. 4, and as noted above, with timing means 12 deactivated the projection 26a will be seated in the angular notch 72 of the disc 23 and the sealing member 70 will be held in spaced relation from the orifice 16 by the contact member 80.

Figure 5:
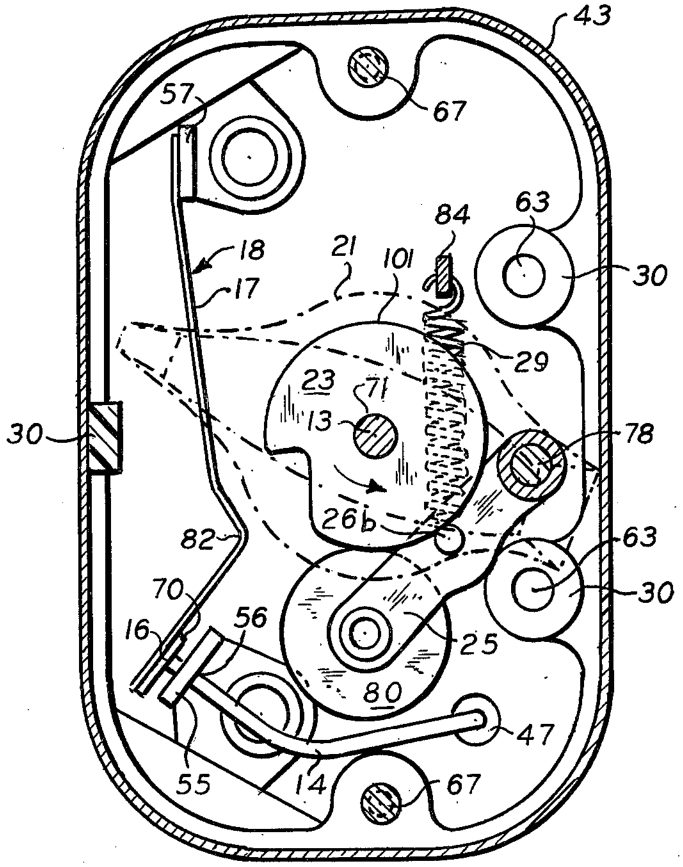
FIG. 5 is a view similar to FIG. 4 but with the control means and venting member in a second position.

As above-described, timing means 12 is activated by manually rotating the knob 21 in a clockwise direction, shown by the arrow in FIG. 4, to the desired time setting, thereby simultaneously effecting the rotation of the shaft 13 and the disc 23. As shown in FIG. 5, as disc 23 is rotated, the camming action of the angular notch 72 operates to urge the upper portion 26a of the projection 26 out of said notch 72 and onto the periphery 101 of the disc 23 thereby effectuating a slight pivoting of the connecting rod 25 about the post 78. The projection 26a is held in close sliding relation with the periphery 101 by the spring 29. At the same time, the pivotal motion of the rod 25 brings the contact member 80 out of engaging relation with the elbow 82 of the arm 17, thereby releasing the arm and allowing the sealing member 70 to move into overlapping sealing relation with the bleed orifice 16. With the bleed orifice 16 thus sealed, air from the supply pressure source 90 will no longer flow unrestrictedly through the orifice 16, whereby the pressure in the conduit 14 will be raised to the level of the pressure of the supply source 90, the increase in pressure being sufficient to effectuate opening of the pneumatic switch 92. It is readily apparent to those skilled in the art that the operation of any number of pneumatic apparatus may be simultaneously controlled in this manner by the device 10.

As described above, after timing means 12 has been activated the shaft 13 is rotated in a counterclockwise direction, as shown by the arrow in FIG. 5, the shaft 13, the knob 21 and the disc 23 all being returned to their initial positions upon the expiration of the selected time period. Thereupon, the portion 26a of the projection 26 will drop into notch 72 under the urging of the spring 29 thus pivoting the connecting rod 25 about the post 78 and back to its initial position. At the same time, contact member 80 is moved into engaging relation with the arm 17 thus forcing said arm to the left as viewed in FIG. 4, the sealing member 70 thus being moved out of overlapping sealing relationship with the bleed orifice 16. This unsealing of the orifice 16 in turn results in the unrestricted flow of air from the supply source 90 through the orifice 16, the pressure in the conduit 14 returning to atmospheric pressure thereby closing the pneumatic switch 92. At this point, the device 10 has been restored to its initial condition and a full cycle of operation has been achieved.

It will be obvious to anyone skilled in the art that certain portions of the device 10 have been omitted from this description and the drawings. Particularly, the timing mechanism itself and more specifically means for connecting the shaft 13 to the timing mechanism to effectuate activation thereof as well as means for rotating the shaft 13 back to its initial position after the timing mechanism has been activated have not been shown, it being believed that their construction is well known to the skilled art worker and accordingly descriptions thereof are deemed unnecessary for this specification. A description of a timing mechanism adaptable for use with the control device 10 of the present invention as well as a description of a means for suitably connecting the shaft 13 to said timing mechanism are contained in U.S. Pat. No. 2,583,245, the contents of which are incorporated herein by reference in their entirety.

Similarly, the construction of the supply pressure source 90 and pneumatic switch 92 have been omitted, these particulars likewise being deemed obvious to the skilled art worker.

While, as above-described and shown in FIG. 4, biasing the venting member 18 serves to open the orifice 16, reversal of this procedure may readily be effectuated by anyone skilled in the art whereby the forcing of the venting member 18 to the left by contact member 80 will close and seal the orifice 16, the orifice 16 being open when there is no engagement between contact member 80 and venting member 18. Moreover, while spring biasing of the member 18 is preferred, other biasing means readily apparent to the skilled art worker such as, for example, a gravity bias, a magnetic bias, or even a pneumatic bias are readily adaptable and any may be used. It is also deemed obvious that means other than biasing may be used for controlling the movement of the venting member 18, such as, for example, by suitably connecting the connecting rod 15 directly to the venting member 18.

While it was assumed for purposes of illustrating the mode of operation that with the orifice 16 sealed the pressure in the conduit 14 would be higher than the atmospheric pressure within the structure 40, it is also possible for the pressure within the conduit 14 to be lower than the pressure within the structure 40, it only being necessary for proper functioning of the device 10 that the changes in pressure in the conduit 14 resulting from the opening and closing of the orifice 16 be sufficient to operate the associated pneumatic apparatus.

Figure 7:
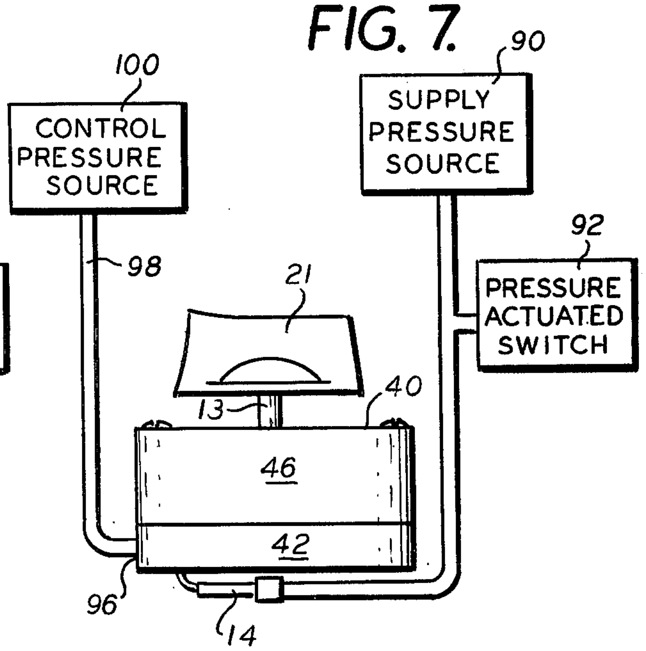
FIG. 7 is a view similar to FIG. 6 but showing an alternative embodiment of the pneumatic control device in a different pneumatic control system.

Referring now to FIG. 7, a modified form of the control device 10 is illustrated that incorporates all the structure of the device of FIGS. 1–6. In addition, however, a preferably metallic tubular supply member 98 extends through a second opening 96 in the base member 42, the portion of said supply member within the structure 40 being open-ended, the other end being adapted to be connected to a control pressure source 100. Furthermore, the structure 40 is hermetically sealed such that the pressure therein will be determined by the pressure supplied by the control source 100 when said venting member 18 is in said second position. In this embodiment, with the bleed orifice 16 open, the pressure within the pneumatic conduit 14 will be determined by the pressure within the structure 40 as regulated by the control source 100. Thus, by varying the pressure of the control source 100 any desired pressure changes may be established in the conduit 14 upon the sealing and unsealing of the orifice 16.

As is well known to the skilled art worker, if very high or very low pressures are to be supplied by the control source 100, and assuming atmospheric pressure outside the device 10, the structure 40 must be sufficiently strong to withstand the resulting pressure differentials.

While as described above, venting of the orifice 16 is preferably accomplished by use of the arm 17 and the sealing member 70, various alternative means are available for this purpose and any may be used. In one alternative arrangement, pneumatic conduit 14 is comprised of compressible resilient material, such as, for example, rubber tubing, the venting member 18 being movable between a first position in which the tubing is "pinched-off", thus constricting the conduit 14 such that substantially no air will flow through the orifice 16, and a second position in which the "pinch-off" is removed. Construction of a suitable venting member and means for connecting same to the control means 20 is deemed obvious to the skilled art worker, and, accordingly, the descriptions thereof have been omitted.

While I have herein shown and described the preferred embodiments of the present invention and have suggested modifications therein, other changes and modifications may be made therein within the scope of the appended claims without departing from the spirit and scope of this invention.

What is claimed is:

1. In a pneumatic control device for controlling the operation of associated pneumatic apparatus of the type wherein a pneumatic conduit having a pressure bleed orifice is connected to said pneumatic apparatus, a supply pressure source is connected to said pneumatic conduit for pressurizing said conduit, and wherein said pneumatic apparatus assumes one mode of operation when the pressure in said conduit is at a first level and a second mode of operation when the pressure in said conduit is at a second level, the improvement comprising:

a venting arm for controlling the flow of air through said bleed orifice to thereby control the pressure in said conduit, said arm being movable between (a) a first position wherein a portion of said arm is in sealing relation with said bleed orifice, the flow of air through said bleed orifice is restricted and said conduit is pressurized to one of said first and second levels; and (b) a second position in which said arm is in spaced relation from said bleed orifice, the flow of air through said bleed orifice is substantially unrestricted and said conduit is pressurized to the other of said first and second levels;

timing means, means for activating said timing means for a preselected time interval and means for deactivating said timing means said preselected time interval after activation thereof;

a manually rotatable shaft operatively connected to said timing means activating means, rotation of said shaft in one direction away from an initial position effecting operation of said activating means to activate said timing means for a preselected time interval dependent on the angle through which said shaft is rotated, said shaft also being operatively connected to said deactivating means, said deactivating means returning said shaft to said initial position upon expiration of said preselected time interval; and control means operatively connected to said shaft for movement between a first position upon rotation of said shaft in one direction, and a second position upon return of said shaft to said initial position, said control means effecting movement of said arm to one of said first and second arm positions when said control means is in one of said first and second positions and for effecting movement of said arm to the other of said first and second arm positions when said control means is in the other of said first and second positions.

2. A pneumatic control device according to claim 1, wherein said arm is moved to said first position upon said timing means being activated, and to said second position upon said timing means being deactivated.

3. A pneumatic control device according to claim 2, wherein said orifice is defined by an open end of said conduit.

4. A pneumatic control device according to claim 3, and further comprising a sealing member fixedly secured to said portion of said arm which is movable into sealing relation with said bleed orifice, said sealing member being comprised of a compressible air impervious material for sealing said orifice when said venting member is in said first position.

5. A pneumatic control device according to claim 4, and further comprising a fixed lower partition, for supporting said control means, wherein said arm is comprised of a resilient material biasing said arm to said first arm position and wherein said control means comprises a disc having a peripheral notch therein, said disc being fixedly secured to said shaft for rotation therewith, a connecting rod having a projection engageable with the periphery of said disc, one end of said connecting rod being pivotally mounted on said partition and the other end of said rod being engageable with said arm, and a spring, one end of said spring being secured to said partition and the other end being secured to said connecting rod for biasing said projection into engagement with the periphery of said disc, said disc and projection being relatively located so that said projection is disposed in said notch in said disc when said shaft is in said initial position in which position said other end of said connecting rod engages said arm for moving said arm toward said second position, said projection being movable out of said notch when said disc is rotated upon rotation of said shaft in said one direction to activate said timing means, the pivotal movement of said connecting rod moving said connecting rod other end out of engagement with said arm whereby the resiliency of said arm moves said arm to said first position.

* * * * *

UNITED STATES PATENT OFFICE
CERTIFICATE OF CORRECTION

Patent No. 4,090,531 Dated May 23, 1978

Inventor(s) Lawrence J. Laviana

It is certified that error appears in the above-identified patent and that said Letters Patent are hereby corrected as shown below:

Column 4, line 24: "orifice 15" should read -- orifice 16 --.

Column 6, line 34: "rod 15" should read -- rod 25 --.

Signed and Sealed this

*Fifteenth* Day of *May 1979*

[SEAL]

*Attest:*

RUTH C. MASON
*Attesting Officer*

DONALD W. BANNER
*Commissioner of Patents and Trademarks*